United States Patent [19]

Luken, Jr. et al.

[11] Patent Number: 4,759,709

[45] Date of Patent: Jul. 26, 1988

[54] WAX COMPOSITIONS

[75] Inventors: Clement H. Luken, Jr., Highland Heights; Donald V. Kinsman, Fort Thomas, both of Ky.

[73] Assignee: National Distillers and Chemical Corporation, New York, N.Y.

[21] Appl. No.: 77,146

[22] Filed: Jul. 23, 1987

Related U.S. Application Data

[62] Division of Ser. No. 830,044, Feb. 18, 1986, Pat. No. 4,714,496.

[51] Int. Cl.$^4$ .......................... F23D 3/16; B05D 1/18
[52] U.S. Cl. ..................................... 431/288; 427/443
[58] Field of Search ....................... 427/443; 106/270; 44/2.5; 260/413; 431/288

[56] References Cited

U.S. PATENT DOCUMENTS 4,118,203 10/1978 Beardmore et al. ................ 106/270
4,293,345 10/1981 Zeilstra et al. ..................... 260/413

OTHER PUBLICATIONS

Worth, A. H, "The Chemistry of Waxes", Nov. 16, 1956, p. 659.

*Primary Examiner*—Janyce A. Bell
*Attorney, Agent, or Firm*—Kenneth D. Tremain; Gerald A. Baracka

[57] ABSTRACT

Improved wax compositions suitable for the preparation of candles, as the sole fuel component or as an overdip applied to a paraffin or paraffin/fatty acid candle, are provided. The compositions of this invention are a blend of a paraffin, a $C_{16}$ or $C_{18}$ saturated fatty acid or mixture of said fatty acids, and an alpha-alkyl-branched carboxylic acid obtained by the free radical addition of a $C_{20-44}$ alpha-olefin or alpha-olefin mixture and a carboxylic acid having 3 to 36 carbon atoms. A process for improving the surface characteristics of paraffin or paraffin/fatty acid candles by applying the present wax compositions thereto as an overdip and the resulting improved candles obtained therefrom are also disclosed.

4 Claims, No Drawings

WAX COMPOSITIONS

This is a division of copending application Ser. No. 830,044, filed Feb. 18, 1986, now U.S. Pat. No. 4,714,496.

BACKGROUND OF THE INVENTION

1. Field of the Invention

This invention relates to improved wax compositions comprise of paraffin, a $C_{16}$ or $C_{18}$ fatty acid, and a high molecular weight alpha-alkyl-branched carboxylic acid which can be used as the sole wax component for the preparation of candles or as an overdip.

2. Description of the Prior Art

Paraffin and stearic acid are the two primary fuel sources used in candles, however, due primarily to cost considerations most candles sold today employ paraffin as the sole or major fuel constituent. Paraffin, which is derived from petroleum, has a distinct cost advantage over stearic acid. This is particularly so in times of falling oil prices.

There are, however, certain advantages associated with the use of stearic acid in candles. Stearic acid has good burning characteristics and a relatively sharp melting point. For this reason, there is increasing emphasis on the use of fuel blends of paraffin and stearic acid for the production of high quality specialty candles, such as non-drip and decorator candles. Virtually all non-drip candles are obtained using dipping operations wherein the ratio of stearic acid to paraffin is increased in the final dipping stages. Some typical paraffin/stearic acid candle compositions are disclosed in U.S. Pat. Nos. 2,638,411 and 4,118,203. Additionally, a general discussion of candles, including the use of paraffin/stearic acid fuel compositions and methods of candle manufacture, is found in Kirk-Othmer *Encyclopedia of Chemical Technology*, Second Edition, Volume 4, pages 58–63.

While the addition of stearic acid to the paraffin imparts a desirable opacity and surface sheen to the candles, dendrites (branched, tree-like figures) can develop, particularly with dipped candles. In colored candles, both distribution of the coloring agent is also evident. Dark spots, i.e., blotches, are present in the candle. The unevenness of coloration is exacerbated by the enhanced opacity of the candle composition. Dendrite formation and unevenness of color can be minimized and in some cases virtually completely eliminated by careful control of processing parameters, primarily by slowing the rate of cooling, however, in commercial candlemaking operations where output is a primary concern this is generally not considered to be economically feasible.

It would be highly advantageous if the formation of dendrites and blotchiness of color in paraffin/stearic acid candles would be eliminated without the use of special processing techniques and controls. It would be even more advantageous if this could be accomplished in a manner which would permit even greater operating latitude.

SUMMARY OF THE INVENTION

We have now quite unexpectedly discovered that these and other advantages are obtained with the present invention wherein a high molecular eight alpha-alkyl-branched carboxylic acid is included in the paraffin/fatty acid mixture. the resulting wax compositions produce dendrite-free candles and, in those instances when a coloring agent is present, uniform coloration throughout the wax mixture. All of this is accomplished without special processing. In fact, with the improved wax compositions of this invention it is possible to utilize a wider range of operating conditions in the candle manufacturing process. The present improved wax compositions can be used for the production of both dipped and molded candles. They can constitute the sole fuel source of the candle or may be utilized as an overdip to improve surface quality of candles.

The wax compositions of this invention contain a paraffin melting in the range 50° C. to 65° C., a $C_{16}$ or $C_{18}$ predominantly of $C_{16}$ and $C_{18}$ saturated fatty acids, and an alpha-alkyl-branched carboxylic acid obtained by the free radical addition of a $C_{20-44}$ alpha-olefin or alpha-olefin mixture with a carboxylic acid having from 3 to 36 carbon atoms. The compositions contain 90 to 98 parts by weight of the paraffin and fatty acid present in a ratio from 9:1 to 1:9 and, more usually, from 2.5:1 to 1:1.5 and 2 to 10 parts by weight of the alpha-alkyl-branched carboxylic acid. In one embodiment of the invention the alpha-alkyl-branched carboxylic acid is derived from an alpha-olefin mixture wherein 85 percent or more of the olefins contain from 26 to 40 carbon atoms and a $C_{3-22}$ monocarboxylic acid or $C_{6-36}$ dicarboxylic acid. Highly useful wax compositions are obtained when the alpha-alkyl-branched monocarboxylic acid is obtained form the reaction of a $C_{12-18}$ saturated fatty acid or mixture of said fatty acids with an alpha-olefin on an essentially 1:1 molar basis. A process for improving the surface characteristics of paraffin or paraffin/fatty acid candles by applying the present wax compositions thereto as an overdip and the resulting improved candles obtained therefrom are also described.

DETAILED DESCRIPTION

The present invention relates to improved wax compositions which can be used as the sole wax component for candles or as an overdrip. The wax compositions are a blend of paraffin, a $C_{16}$ or $C_{18}$ fatty acid, and a high molecular weight alpha-alkyl-branched carboxylic acid.

Paraffins useful for the formulation of the compositions of this invention include any of the paraffin waxes melting in the range 50° C. to about 65° C. (ASTM Test Method D-87). These waxes are obtained from petroleum sources and are comprised primarily of straight-chain hydrocarbons (minimum 85% normal) having average carbon numbers ranging from about 22 to about 36. They are readily available from commercial suppliers. Paraffins are generally characterized as white, translucent, tasteless, odorless, waxy solids and are insoluble in water. Paraffin waxes melting in the range 54° to 61° C. and having average carbon number ranging from about 25 to about 30 are especially useful for this invention. Mixtures of paraffins can also be used. Additionally, it is also possible to utilize synthetic waxes which meet the above requirements, e.g. waxes obtained by the Fisher-Tropsch process.

Commercially available paraffins which can be used to obtain the improved candle wax compositions of this invention include: Paraffin Wax P-127 and P-137 from Sun Refining and Marketing Company; Shellwax (trademark) 200 from Shell Chemical Company; 1430 Fully Refined Paraffin Wax from Boler Petroleum Company; Parvan (trademark) Branch 3830 and Mobilwax (trademark) 140 from Exxon Company; and Eskar (trademark) Wax R-40 from Amoco Chemical Corporation.

Fatty acids used are $C_{16}$ and $C_{18}$ straight-chain saturated fatty acids, i.e., palmitic acid and stearic acid, and mixtures thereof. Since virtually all commercially available palmitic acid and stearic acid is obtained from natural fats and oils, the fatty acid is generally a mixture of palmitic acid and stearic acid wherein said acids are present in a weight ratio from about 4:1 to about 1:4. Especially useful fatty acids mixtures have weight ratios of stearic acid to palmitic acid of 2:1 to 1:2. Other fatty acids having from about 14 to 24 carbon atoms can also be present in the mixture in minor amounts. The fatty acid or fatty acid mixture will generally have a titer (AOCS Method Tr 1a-64 T) in the range 53° C. to 65° C. and, more preferably, from 54° C. to 60° C. Useful fatty acids for the wax compositions of this invention may also be synthetically produced.

An alpha-alkyl-branched carboxylic acid is combined with the paraffin and $C_{16}/C_{18}$ fatty acid to obtain the improved wax compositions of this invention. The alpha-alkyl-branched acids are high molecular weight acids obtained by the free radical addition of a $C_{20}$-$C_{44}$ alpha-olefin or alpha-olefin mixture with an aliphatic mono- or dicarboxylic acid having from about 3 to 36 carbon atoms. Acids obtained by such free radical additions are predominantly saturated alpha-alkyl-branched acids and, when reacted on a 1:1 molar basis, can contain from 23 to 80 carbon atoms. The molecular weight of the acids will, of course, depend on the particular carboxylic acid and alpha-olefin or alpha-olefin mixture used, the ratio of the reactants and reaction conditions. Free radical addition processes for reacting alpha-olefins and carboxylic acids are known and described in the prior art in British Patent Specification Nos. 960,894, 1,098,464, 1,098,465 and U.S. Pat. No. 2,823,216.

Carboxylic acids used to obtain the alpha-alkyl-branched acids include saturated or unsaturated aliphatic mono- or dicarboxylic acids having from 3 to 36 carbon atoms. monocarboxylic acids will typically contain from 3 to 22 carbon atoms whereas the dicarboxylic acids will have from 6 to 36 carbon atoms. Mixtures of $C_{12-18}$ saturated monocarboxylic acids, i.e., fatty acids, are most advantageously utilized. Illustrative mono- and dicarboxylic acids employed to obtain the alpha-alkyl-branched acids include pripionic acid, pelargonic acid, lauric acid, myristic acid, pentadecanoic acid, palmitic acid, margaric acid, oleic acid, stearic acid, adipic acid, azelaic acid, sebacic acid, dodecanedioic acid, polymeric fatty acids, e.g., $C_{36}$ dimer acid, obtained by the dimerization of unsaturated $C_{18}$ fatty acids such as oleic acid, linoleic acid, tall oil fatty acids, and the like. In an especially useful embodiment of the invention, the alpha-alkyl-branched carboxylic acid is a monocarboxylic acid derived from a $C_{12-18}$ saturated fatty acid or mixture of said fatty acids.

An alpha-olefin having from about 20 to 44 carbon atoms is reacted with the mono-or dicarboxylic acid to obtain the high molecular weight alpha-alkyl-branched acid. The alpha-olefin may be a single olefin but, more typically, will be a mixture of olefins having from 20 to 44 carbon atoms. Small amounts of olefins containing less than 20 carbon atoms may be present but for best results the amount should not exceed about 10 percent by weight and, more typically, will be less than 5 weight percent. Preferably, the alpha-olefin will be a mixture wherein 85 percent or more of the olefins have from 26 to 40 carbon atoms. Internal olefins may be present in the mixture, however, alpha-olefins ($>C=CH_2$) should constitute at least 55 percent of the mixture and, more preferably, 70 percent by weight or more. Both vinyl compounds ($RHC=CH_2$) and vinylidene compounds ($RRC=CH_2$) can be present and are included within the definition of the alpha-olefins for the purpose of this invention.

Alpha-olefins satisfying the above requirements are obtained by chain growth reactions, wherein ethylene is added to an aluminum alkyl and inserted between the aluminum and one of the alkyl groups. Such processes are practiced commercially and described in the literature. Alpha-olefins of predetermined average size are obtained by terminating the growth reaction when the required amount of ethylene has been added and then displacing the long-chain alkyl group. The length of the alkyl group will be dependent on the reaction conditions employed and the amount of ethylene charged. Numerous variations of these processes are possible to shift the alpha-olefin distribution and are within the skill of the art. Where olefins having a narrow molecular weight distribution are desired it may be necessary to fractionally distill, solvent extract or otherwise treat the resulting olefin product prior to preparation of the high molecular weight alpha-alkyl-branched acids.

Alpha-olefin mixtures are available from commercial sources and can be used to obtain the high molecular weight alpha-alkyl-branched acids useful for the preparation of the improved wax compositions of this invention. For example, Gulf's $C_{20-24}$ alpha-olefin fraction, $C_{24-28}$ alpha-olefin fraction and $C_{30+}$ alpha-olefin fraction can be advantageously employed. The $C_{20-24}$ alpha-olefin fraction has a melting point (ASTM D 127) of about 90° F. and typically contains 49 percent $C_{20}$, 42 percent $C_{22}$, and 8 percent $C_{24}$ olefins. The $C_{24-28}$ alpha-olefin fraction has a melting point of 114° F. and typically contains 28 percent $C_{24}$, 44 percent $C_{26}$, 20 percent $C_{28}$, and 8 percent $C_{30+}$ olefins. The $C_{30+}$ alpha-olefin fraction has a melting point of about 160° F. and generally contains 85 to 98 percent $C_{28-44}$ alpha-olefins. A detailed compositional breakdown obtained by gas-liquid chromatographic analysis of two different $C_{30+}$ alpha-olefin samples showed the following oligomer distribution:

| Olefin Component | Sample 1 | Sample 2 |
| --- | --- | --- |
| $C_{24}$ | 0.9 | 0.3 |
| $C_{26}$ | 6.1 | 3.8 |
| $C_{28}$ | 14.8 | 15.4 |
| $C_{30}$ | 17.3 | 21.3 |
| $C_{32}$ | 15.8 | 19.4 |
| $C_{34}$ | 13.8 | 14.7 |
| $C_{36}$ | 8.9 | 11.5 |
| $C_{38}$ | 6.7 | 7.6 |
| $C_{40}$ | 4.9 | 4.7 |
| $C_{42}$ | 3.5 | 1.6 |
| $C_{44}$ | 3.3 | — |
| $C_{46}$ | 2.0 | — |
| $C_{48}$ | 1.3 | — |
| Total | 99.3 | 100.3 |

The reaction to obtain the alpha-alkyl-branched acid is illustrated by the following equation where a $C_{30}$ alpha-olefin and the stearic acid are reacted on a 1:1 molar basis.

$$C_{28}H_{57}CH=CH_2 + C_{17}H_{35}COOH \longrightarrow \quad (I)$$

$$C_{28}H_{57}CH_2CH_2-\overset{\overset{\displaystyle C_{16}H_{33}}{|}}{C}HCOOH$$

While the resulting alpha-alkyl-branched monocarboxylic acid obtained in equation I contains 48 carbon atoms, it is evident that the number of carbon atoms, and therefore the molecular weight of the resulting branched-chain acid, will vary depending on the particular alpha-olefin and monocarboxylic acid used. For example, if a $C_{26-40}$ olefin mixture is employed with stearic acid, a mixture of alpha-alkyl-branched monocarboxylic acids containing from 44 to 58 carbon atoms will be obtained.

In addition to the 1:1 reaction product obtained in accordance with equation I, a second olefin molecule can react with the monocarboxylic acid to produce a 2:1 (olefin:acid) reaction product, i.e., alpha, alpha-dialkyl-branched monocarboxylic acid. This reaction may be represented as follows when a $C_{30}$ alpha-olefin and stearic acid are the reactants.

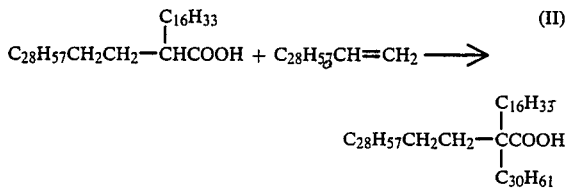

The above reaction is favored if an excess of olefin is present, however, the reaction can occur even when a molar excess of the acid is used--which is the usual procedure for carrying out the reaction. The presence of substantial amounts of the 2:1 reaction products are not detrimental to the improved wax compositions of the present invention.

As will be apparent from the above equations, a more complex mixture of products will be obtained when dicarboxylic acids and polymeric fatty acids are reacted with the alpha-olefin. Also, it should be noted that under the free radical conditions of the reaction it is possible for the alpha-olefin to form dimer and possibly higher oligomers which can also react with the carboxylic acid. For example in equation I, the $C_{30}$ alpha-olefin might dimerize to form a $C_{60}$ alpha-olefin which in turn can react with the stearic acid to yield a $C_{78}$ alpha-alkyl-branched monocarboxylic acid, or possibly, a $C_{138}$ alpha,alpha-dialkyl-branched monocarboxylic acid. The high molecular weight alpha-alkyl-branched acid product may also contain small amounts of unreacted olefin and/or unreacted carboxylic acid.

Derivatives of the alpha-alkyl-branched carboxylic acids can also be used in the formulation of the wax compositions of this invention. Metal soaps, esters, and ester/soaps of the acids are particularly advantageous derivatives, however, amide derivatives can also be used. These derivatives can have all or only a portion of the available carboxyl functionality of the alpha-alkyl-branched acid reacted.

The improved wax compositions of the invention contain from 2 to 10 parts by weight of the alpha-alkyl-branched acid and 90-98 parts paraffin/fatty acid mixture. More preferably, 2.5 to 5 parts by weight alpha-alkyl-branched carboxylic acid is combined with 94 to 97.5 parts paraffin/fatty acid. The ratio of paraffin to fatty acid in the paraffin/fatty acid mixture can range from 9:1 to 1:9, on a weight basis. The ratio of paraffin to fatty acid more typically ranges from 2.5:1 to 1:1.5.

Small amount of other additives including other waxes, mold release agents, coloring agents, and fragrance materials can be included in the fuel composition to obtain useful candles. The addition of such agents is particularly advantageous if the wax compositions of this invention comprise the sole fuel component for the candle. If other waxes are added, they can be present at levels from about 0.1 percent to 10 percent, by weight, of the total wax composition. Most generally, these supplemental waxes will be used in an amount from about 0.5 to about 5 percent. Such waxes can include, for example, microcrystalline waxes, montan wax, carnauba wax, castor wax, Fisher-Tropsch waxes, and aliphatic amide waxes.

Additives such as mold release agents and agents which color or impart a pleasing scent to the candle typically are used in amounts from about 0.1 to 4 percent, by weight, and, more generally, from about 0.5 to 3 weight percent. To be useful such additives must be compatible with the wax composition and should not significantly alter its melt characteristics. Acceptable mold release agents include mineral oils, silicone oils, and other commercially available proprietary compositions. Conventional organic dyes are most generally used as colorants, however, inorganic pigments can be utilized at low levels to obtain light colors. Any of the known oil-based or oil-compatible fragrances can be used.

The improved wax compositions of this invention are readily processable and candles manufactured therefrom are obtained in accordance with conventional candlemaking procedures. The present waxes can constitute the total wax composition of the candle, however, in an especially useful embodiment these waxes are employed as an overdip. In this latter procedure, one or more layers of the wax are applied as the finish to coat the candles which have another wax as the primary fuel component. This techniques is particularly advantageous where the primary wax is a lower quality wax which is susceptible to dendrite formation, produces nonuniform coloration or which generally imparts other undesirable surface qualities. Overdipping with the improved wax compositions of this invention makes it possible to obtain candles having acceptable surface qualities while utilizing a lower cost wax as the fuel source. A single overdip may be sufficient or multiple overdipping operations may be advantageous. Also, if multiple overdippings are involved, the wax compositions applied as the overdip may be varied.

The wax compositions of this invention can be used for the preparation of dipped, molded, or rolled candles. They are particularly advantageous, however, for use in dipping operations.

The following examples more fully illustrate the wax compositions of this invention and their use for the preparation of candles. For these examples, all parts and percentages are on a weight basis unless otherwise indicated.

Various alpha-alkyl-branched carboxylic acids were prepared and used throughout the examples:

(A) Preparation of alpha-methyl-branched $C_{33}+$ monocarboxylic acid: A one-liter glass reactor was charged with 200 grams of a commercial $C_{30+}$ alpha-olefin mixture containing about 80 percent $C_{30}$ and higher olefins, 326 grams propionic acid, and 8 grams di-t-butyl peroxide. The system was flushed with nitrogen and a slight nitrogen flow maintained while the reaction mixture was heated at reflux for four hours. At the completion of the reaction, unreacted propionic was removed under vacuum at 200° C. to obtain 225 grams of the desired alpha-methyl-branched acid product which had an acid value of 48.

(B) Preparation of alpha-heptyl-branched $C_{39+}$ monocarboxylic acid: Employing a reaction procedure similar to that described for (A), perlargonic acid was reacted with the $C_{30+}$ alpha-olefin mixture at a 10:1 molar ratio using di-t-butyl peroxide initiator to obtain the alpha-heptyl branched monocarboxylic acid.

(C) Preparation of alpha-hexadecyl-branched monocarboxylic acid: Following the general procedure described for (A), 46.24 grams of the $C_{30+}$ alpha-olefin mixture and 50.13 grams mixed fatty acid (55% stearic, 41% palmitic, 3% myristic) were reacted using 3.62 grams di-t-butyl peroxide initiator. The resulting product, which was a mixture of predominantly alpha-$C_{16}$-branched $C_{48+}$ monocarboxylic acids and alpha-$C_{14}$-branched $C_{46+}$ monocarboxylic acids, had a melting point of 54°–58° C.

(D) Preparation of alpha-decyl-branched $C_{42+}$ monocarboxylic acid: The acid was obtained following the general procedure described for (A) by refluxing 199 grams lauric acid (99%) and 250 grams of the $C_{30+}$ alpha-olefin mixture with 73.11 grams di-t-butyl peroxide initiator.

(E) Preparation of 1:1 reaction product of $C_{30+}$ alpha-olefin mixture and $C_{36}$ dimer acid: In accordance with the general procedure described above the (A), 125 grams of the $C_{30+}$ alpha-olefin mixture and 287.5 grams dimer acid (97%) were combined and reacted using 36.56 di-t-butyl peroxide initiator to obtain a predominantly alpha-alkyl-branched $C_{66+}$ dicarboxylic acid.

For comparative purposes, various alpha-alkyl-branched carboxylic acids were prepared from alpha-olefins having fewer than 20 carbon atoms as follows:

(F) Comparative: A mixed acid product containing predominantly alpha-hexadecyl-branched $C_{30}$ monocarboxylic acid and alpha-tetradecyl-branched $C_{28}$ monocarboxylic acid was obtained by reacting 117.83 grams $C_{12}$ alpha-olefin and 383.6 grams mixed fatty acid (55% stearic, 41% palmitic, 3% myristic) using 27.78 grams di-t-butyl peroxide initiator in accordance with the general procedure described for (C).

(G) Comparative: A mixed acid product wherein the predominant acids were alpha-hexadecyl-branched $C_{36}$ monocarboxylic acid, alpha-tetradecyl-branched $C_{34}$ monocarboxylic acid, alpha-hexadecyl-branched $C_{34}$ monocarboxylic acid, and alpha-tetradecyl-branched $C_{32}$ monocarboxylic acid was prepared by reacting 149.16 grams of an alpha-olefin mixture (84% $C_{18}$/15% $C_{16}$), 328.8 grams of a mixed fatty acid (55% stearic, 41% palmitic, 3% myristic) and 23.40 grams di-t-butyl peroxide in accordance with the general procedure described for (C).

(H) Comparative: Following the procedure of Example (E) a 1:1 reaction product of $C_{12}$ alpha-olefin and $C_{36}$ dimer acid was prepared. For the reaction, 55.55 grams $C_{12}$ alpha-olefin, 377.52 grams dimer acid (97%) and 12.93 grams di-t-butyl peroxide initiator were reacted to obtain the predominantly alpha-alkyl-branched $C_{48}$ dicarboxylic acid.

(I) Comparative: A predominantly alpha-alkyl-branched $C_{54}$ dicarboxylic acid was prepared in accordance with the procedure described for (E) by reacting 77.07 grams of a $C_{18}$ alpha-olefin mixture, 354.64 grams dimer acid (97%), and 12.15 grams di-t-butyl peroxide initiator.

Paraffin/fatty acid blends containing the high molecular weight branched-chain monocarboxylic acids (A)–(I) were prepared and used to make dipped candles using a conventional laboratory scale dipping apparatus. For the operation, a No. 36 pre-dipped wick was immersed into molten wax and withdrawn and allowed to cool so that the wax solidified. The cycle was repeated until a taper of the desired thickness was obtained. The residence time (the length of time of immersion), cycle time (the length of time for each immersion/cooling cycle), and total time of the dipping operation were recorded along with the ambient temperature and temperature of the molten wax. Upon completion of the operation, the candles were visually examined and characterized.

EXAMPLE I

Three wax compositions (identified as IA, IB, and IC) were prepared and dipped candles prepared therefrom. The wax compositions were blends of paraffin (Eskar (trademark) R-40) and a commercial fatty acid containing 55% stearic acid, 41% palmitic acid, and 3% myristic acid. Alpha-alkyl-branched acid (A) was also included in formulation IC. Each formulation also contained 1% of commercial green color concentrate. Weight percentages of the wax components and dipping conditions employed for the candle preparation were as follows:

|  | IA | IB | IC |
|---|---|---|---|
| Paraffin | 49.5 | 89.1 | 49.5 |
| Fatty Acid | 49.5 | 9.9 | 46.53 |
| Alpha-alkyl-branched Acid (A) | — | — | 2.97 |
| Residence Time (sec.) | 2.3 | 2.3 | 2.5 |
| Cycle Time (sec.) | 90 | 90 | 90 |
| Total Time (min.) | 48 | 38 | 41 |
| Wax Temperature (°C.) | 61 | 64 | 61 |
| Ambient Temperature (°C.) | 30 | 29 | 29 |

Whereas candles IA and IB were unacceptable (IA had a rough grainy texture and IB had a somewhat ribbed surface and strongly mottled coloration), candle IC prepared using the wax composition of this invention had a smooth surface with good luster and sheen which was acceptable with light buffing. The color of the candle was also rich and uniform.

EXAMPLE II

Example II was repeated except that a different paraffin (Mobil 140) was used. Compositional details and dipping conditions used were as follows:

|  | IIA | IIB | IIC |
|---|---|---|---|
| Paraffin | 49.5 | 89.1 | 49.5 |
| Fatty Acid | 49.5 | 9.9 | 46.53 |
| Alpha-alkyl-branched Acid (A) | — | — | 2.97 |
| Residence Time (sec.) | 2.7 | 3.0 | 3.0 |
| Cycle Time (sec.) | 90 | 90 | 90 |
| Total Time (min.) | 29 | 47 | 27 |
| Wax Temperature (°C.) | 61 | 67 | 61 |
| Ambient Temperature (°C.) | 26 | 23 | 24 |

Composition IIC which contained the alpha-alkyl-branched acid produced a rich uniformly colored candle having a smooth surface with good luster and sheen. On the other hand, candles IIA and IIB had a somewhat opaque appearance and had no vibrancy of color. Coloration of these candles was also uneven, i.e., blotched of different color intensity were apparent. Candle IIB had a somewhat ribbed surface.

EXAMPLE III

To further demonstrate the advantage obtained with the improved wax compositions of this invention and the ability to utilize other paraffins, wax blends were prepared in accordance with the procedure of Example I and candles prepared therefrom. Compositional details and dipping conditions were as follows:

|  | IIIA | IIIB | IIIC | IIID |
|---|---|---|---|---|
| Paraffin: |  |  |  |  |
| Shellwax (trademark) 200 | 49.5 | 49.5 | — | — |
| Boler Refined Paraffin Wax 1430 | — | — | 49.5 | 49.5 |
| Fatty Acid | 49.5 | 46.53 | 49.5 | 46.53 |
| Alpha-alkyl-branched Acid (A) | — | 2.97 | — | 2.97 |
| Residence Time (sec.) | 2.7 | 2.5 | 3.0 | 2.5 |
| Cycle Time (sec.) | 90 | 90 | 90 | 90 |
| Total Time (min.) | 51 | 45 | 54 | 38 |
| Wax Temperature (°C.) | 60 | 60 | 61 | 61 |
| Ambient Temperature (°C.) | 24 | 24 | 27 | 27 |

Candles prepared using wax compositions IIIB and IIID had a smooth lustrous finish with a uniform, even green color. Candles IIIA and IIIC which did not contain the alpha-alkyl-branched acid additive had a dull grainy texture. Additionally, dendrites were present in candle IIIC and the coloring was mottled.

EXAMPLES IV-VIII

To demonstrate the versatility of the invention and the ability to obtain acceptable candles using other alpha-alkyl-branched carboxylic acids, paraffin/fatty acid/alpha-alkyl-branched acid compositions were prepared and compositional details are set forth in Table I. One percent of a red color concentrate was included in each of the wax blends. Included in the table are two controls which did not contain any alpha-alkyl-branched carboxylic acid. To demonstrate the criticality of the alpha-alkyl-branched carboxylic acids, several comparative wax blends containing alpha-alkyl-branched carboxylic acids derived from olefins having fewer than 20 carbon atoms are also provided. The letter designations for the alpha-alkyl-branched acids indicated in the table refer to the previously described preparations.

Candles IV-VIII prepared from the improved wax compositions of the invention all had a smooth, lustrous finish with uniform, vibrant red color. Candle VI had a particularly attractive finish. On the other hand, the candle (control) which did not contain any alpha-alkyl-branched acid had a very dull finish with a rough, grainy texture over most of the surface. Comparative candles prepared from wax compositions containing alpha-alkyl-branched acids derived from olefins having fewer than 20 carbon atoms also had rough, grainy textured areas. Slight ribbing was also evident using these comparative compositions. Comparative candle E had a particularly dull appearance.

Comparable results are obtained using other alpha-alkyl-branched mono- and dicarboxylic acids. For example, acceptable dipped tapers are obtained utilizing wax blends comprised of paraffin, stearic acid, and alpha-heptyl-branched $C_{39+}$ monocarboxylic acid (B).

EXAMPLE IX

The wax compositions of this invention are also advantageously employed as an overdip. To demonstrate this aspect of the invention an uncolored paraffin candle having a smooth characteristic translucent finish was coated with the wax composition of Example VI except that the color concentrate was omitted. Application of the paraffin/fatty acid/alpha-alkyl-branched acid coating was made by dipping in the conventional manner. The coated candle had significantly improved sheen and luster. When 1% red color concentrate was included with the paraffin, fatty acid and alpha-alkyl-branched carboxylic acid and after several overdippings, an attractive colored candle having superior surface gloss and color characteristics was obtained.

We claim:

1. A process for improving the surface characteristics of a paraffin or paraffin/fatty acid candle by dipping said candle into a wax composition comprising (a) a paraffin melting inthe range 50° C. to 65° C., (b) a $C_{16}$ or $C_{18}$ saturated fatty acid or fatty acid mixture comprised predominantly of $C_{16}$ and $C_{18}$ saturated fatty acids, and (c) an alpha-alkyl-branched carboxylic acid obtained by the free radical addition of a $C_{20-44}$ alpha-olefin or alpha-olefin mixture with a carboxylic acid having from 3 to 36 carbon atoms, to apply one or more layers of essentially uniform thickness of said wax composition thereto.

2. The process of claim 1 wherein (a) has a melting point in the range 54° C. to 61° C., (b) has a titer in the range 54° C. to 60° C., and (c) is derived from an alpha-olefin mixture wherein 85 percent or more of the olefins contain 26 to 40 carbon atoms and a monocarboxylic acid having from 3 to 22 carbona toms reacted on an essentially 1:1 molar basis.

3. The process of claim 2 wherein the monocarboxylic acid is a $C_{12-18}$ saturated fatty acid or mixture of fatty acids.

TABLE I

|  | Examples | | | | | | Comparative | | | | |
|---|---|---|---|---|---|---|---|---|---|---|---|
|  | IV | V | VI | VII | VIII | Control | A | B | C | D | E |
| Wax Components (%): |  |  |  |  |  |  |  |  |  |  |  |
| Paraffin | 49.5 | 49.5 | 49.5 | 49.5 | 49.5 | 49.5 | 49.5 | 49.5 | 49.5 | 49.5 | 49.5 |
| Fatty Acid | 46.53 | 46.53 | 46.53 | 46.53 | 46.53 | 49.5 | 46.53 | 46.53 | 46.53 | 46.53 | 46.53 |
| Alpha-Alkyl-Branched Acid | (E) 2.97 | (E) 2.97 | (C) 2.97 | (D) 2.97 | (D) 2.97 | — | (F) 2.97 | (G) 2.97 | (F) 1.48 (G) 1.48 | (H) 2.97 | (I) 2.97 |
| Residence Time (sec.) | 2.2 | 2.9 | 3.5 | 2.2 | 2.9 | 3.0 | 2.5 | 2.3 | 2.5 | 2.5 | 3.0 |
| Cycle Time (sec.) | 90 | 90 | 90 | 90 | 90 | 90 | 90 | 90 | 90 | 90 | 90 |
| Total Time (min.) | 58 | 53 | 45 | 51 | 50 | 60 | 40 | 41 | 44 | 43 | 48 |
| Wax Temp. (°C.) | 61 | 61 | 59 | 61 | 61 | 60 | 59 | 59 | 59 | 61 | 63 |
| Ambient Temp. (°C.) | 29 | 26 | 26 | 31 | 25.5 | 25 | 24 | 24 | 24 | 22 | 22 |

4. A candle obtained in accordance with the process of claim 1, 2, or 3.

* * * * *